(12) United States Patent
Fields et al.

(10) Patent No.: US 7,454,356 B2
(45) Date of Patent: Nov. 18, 2008

(54) COMPLETELY ANONYMOUS PURCHASING OF GOODS ON A COMPUTER NETWORK

(75) Inventors: Helen B. Fields, Los Angeles, CA (US); Richard A. Lerner, Williamstown, MA (US); William P. Densmore, Jr., Williamstown, MA (US)

(73) Assignee: Clickshare Service Corp., Williamstown, MA (US)

( * ) Notice: Subject to any disclaimer, the term of this patent is extended or adjusted under 35 U.S.C. 154(b) by 860 days.

(21) Appl. No.: 10/415,203

(22) PCT Filed: Oct. 24, 2001

(86) PCT No.: PCT/US01/45285

§ 371 (c)(1),
(2), (4) Date: Apr. 24, 2003

(87) PCT Pub. No.: WO02/39218

PCT Pub. Date: May 16, 2002

(65) Prior Publication Data

US 2004/0034544 A1 Feb. 19, 2004

Related U.S. Application Data

(60) Provisional application No. 60/242,971, filed on Oct. 24, 2000.

(51) Int. Cl.
*G06Q 30/00* (2006.01)

(52) U.S. Cl. ............................................. 705/1; 705/26

(58) Field of Classification Search .................... 705/1, 705/26
See application file for complete search history.

(56) References Cited

U.S. PATENT DOCUMENTS

| 2003/0208411 A1* | 11/2003 | Estes et al. ..................... 705/26 |
| 2005/0033671 A1* | 2/2005 | Hahn-Carlson ............... 705/34 |
| 2006/0218058 A1* | 9/2006 | Wojcik et al. ................. 705/28 |

OTHER PUBLICATIONS

Walker, Leslie, Cloaking Devices Designed for Wary Web Shoppers, Oct. 19, 2000, The Washington Post, washingtonpost.com, Financial p. E01; .com, pp. 1-4.*

* cited by examiner

*Primary Examiner*—Jamisue Plucinski
(74) *Attorney, Agent, or Firm*—Milde & Hoffberg LLP

(57) ABSTRACT

The present invention discloses a system for the anonymous purchase of goods. A Customer requests to purchase some physical goods, the Vendor determines the cost of the goods, and asks the Customer to select a Carrier. The Vendor requests a Customer Token and redirects the Customer's browser to the Carrier, with the Customer Token, a Vendor Token and a description of the package. The Carrier validates the Vendor's Token and uses the Customer's token to request information about the Customer, including shipping instructions. The Carrier assigns a shipping identifier and shipping cost and redirects the Customer's browser back to the Vendor along with the identifier and shipping cost. The Vendor adjusts the cost to include shipping, packages the goods, and labels the packages with the shipping identifier. The Carrier picks up the packages, prints a complete label using the Customer information associated with the shipping identifier and delivers the goods.

24 Claims, 7 Drawing Sheets

Starting a Session at a Vendor

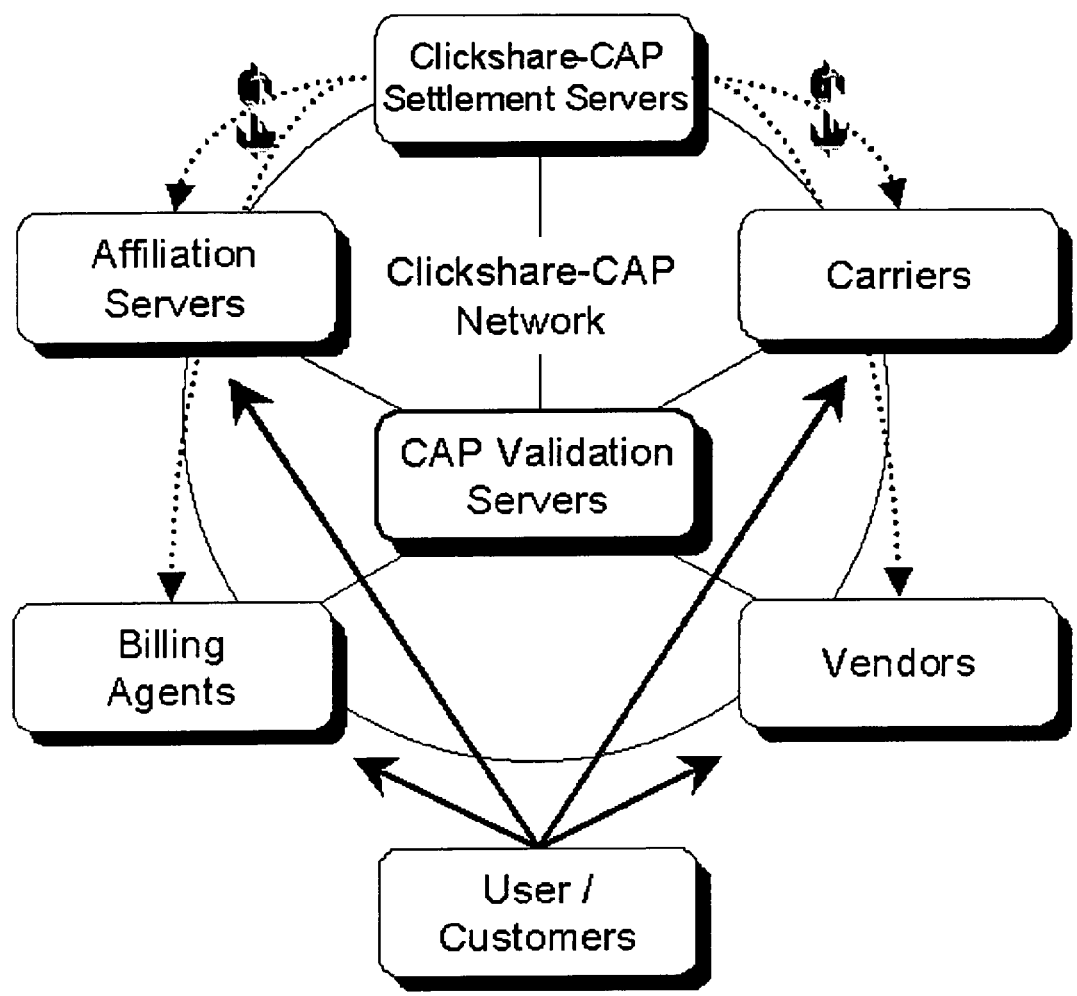
Figure 1: Major Components

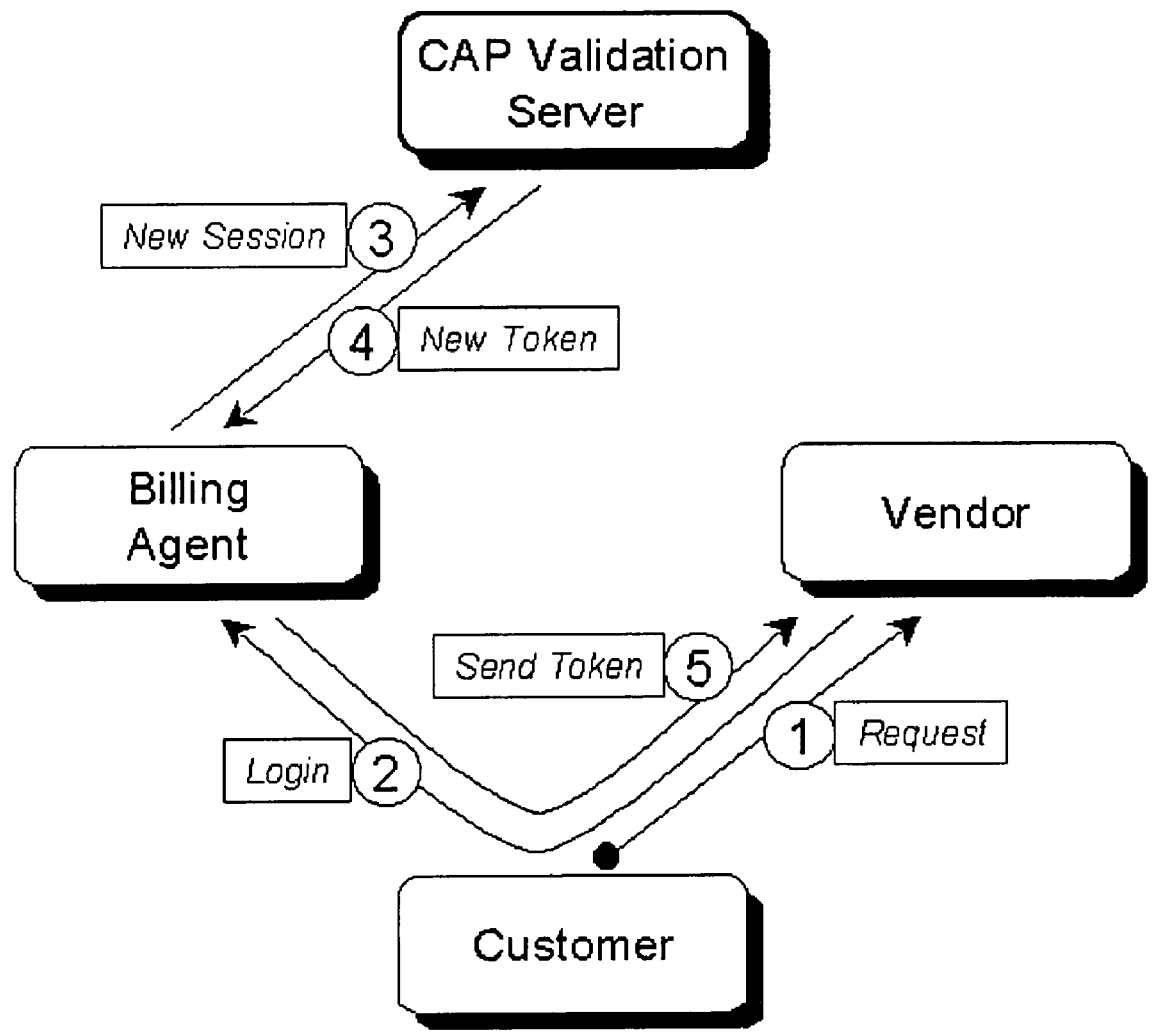
Figure 2: Starting a Session at a Vendor

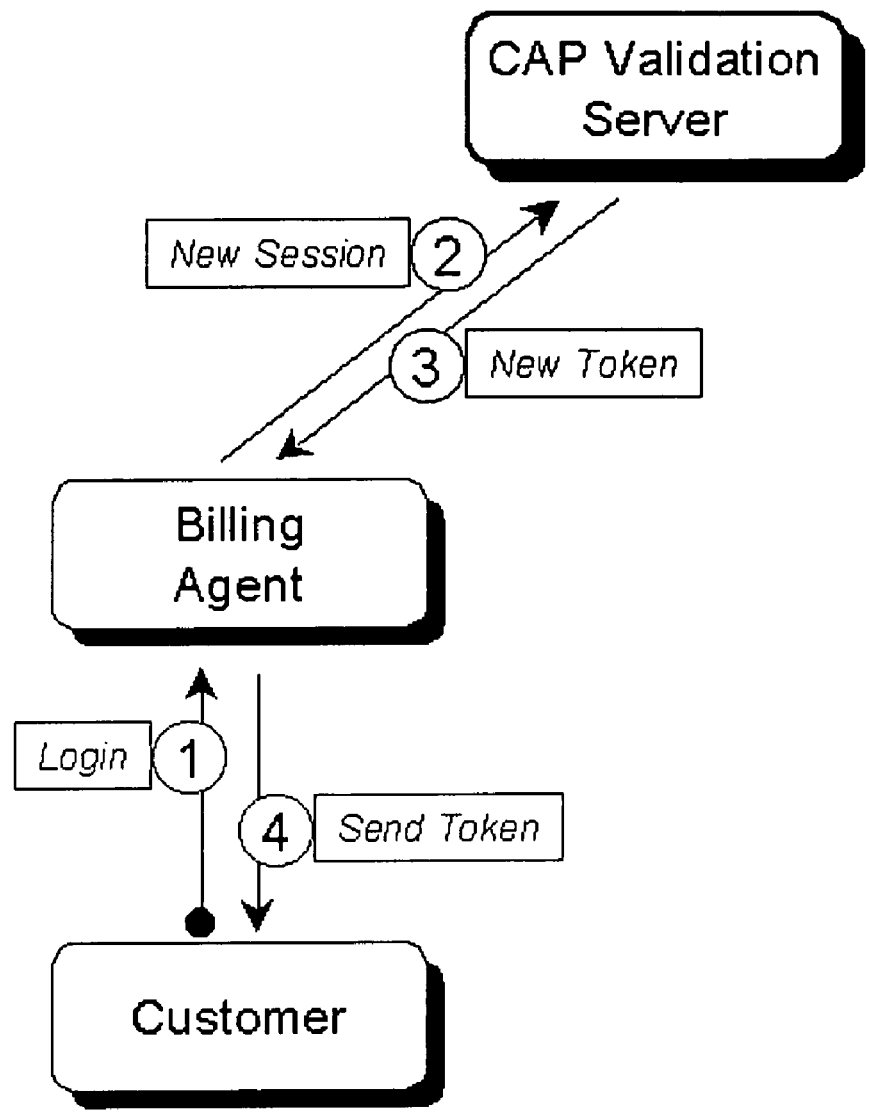
Figure 3: Starting a Session at User's Agent

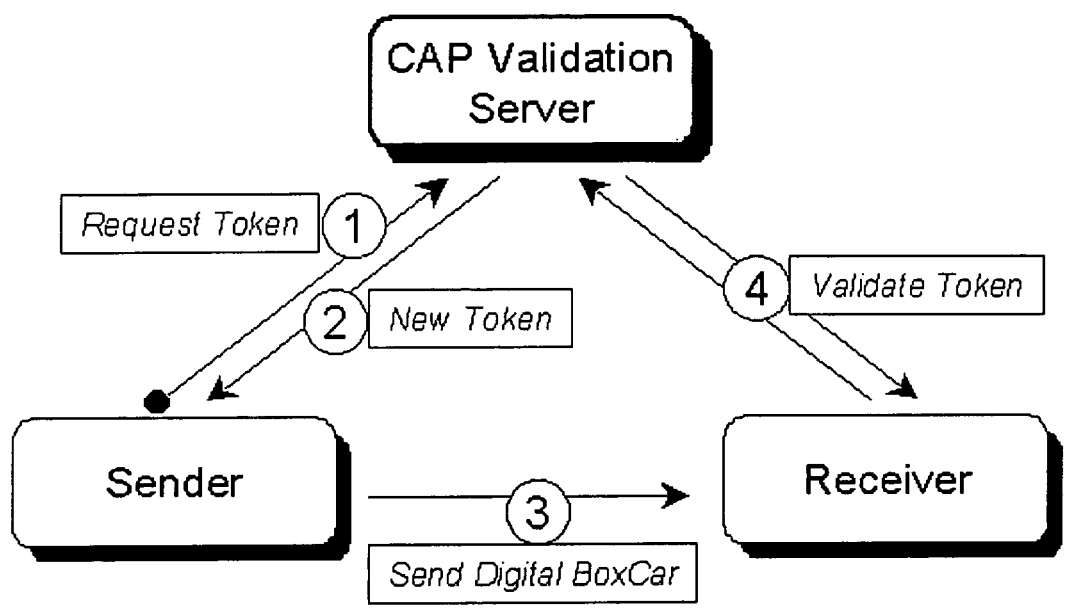
Figure 4: Sending Digital BoxCars

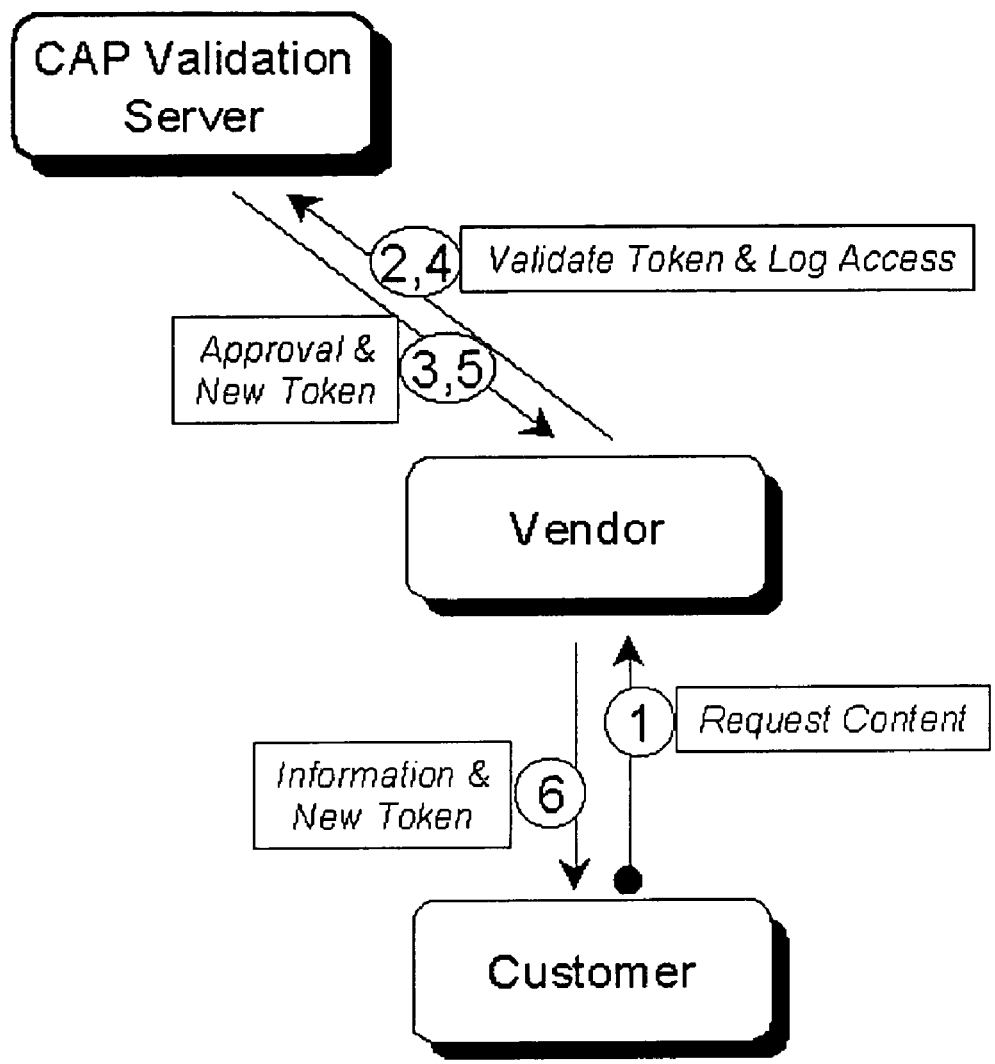
Figure 5: Anonymous Digital Purchase

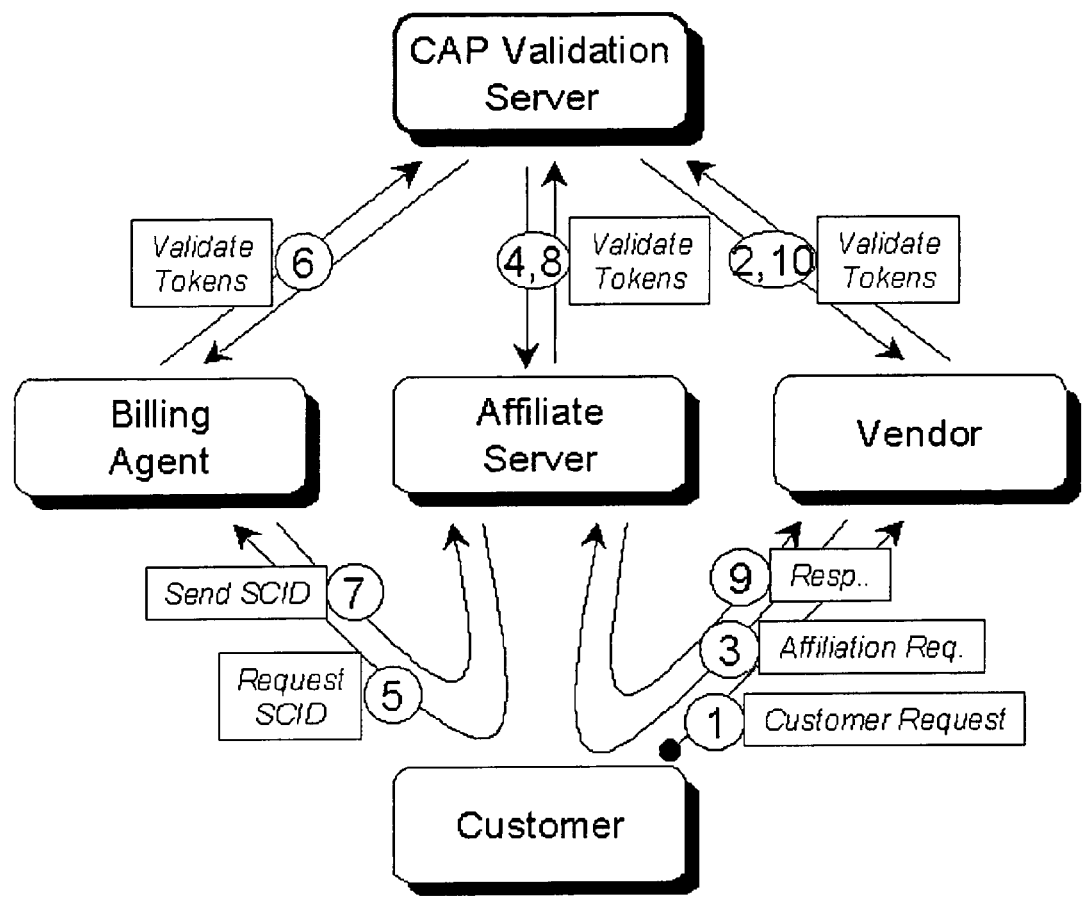
Figure 6: Affinity Certification

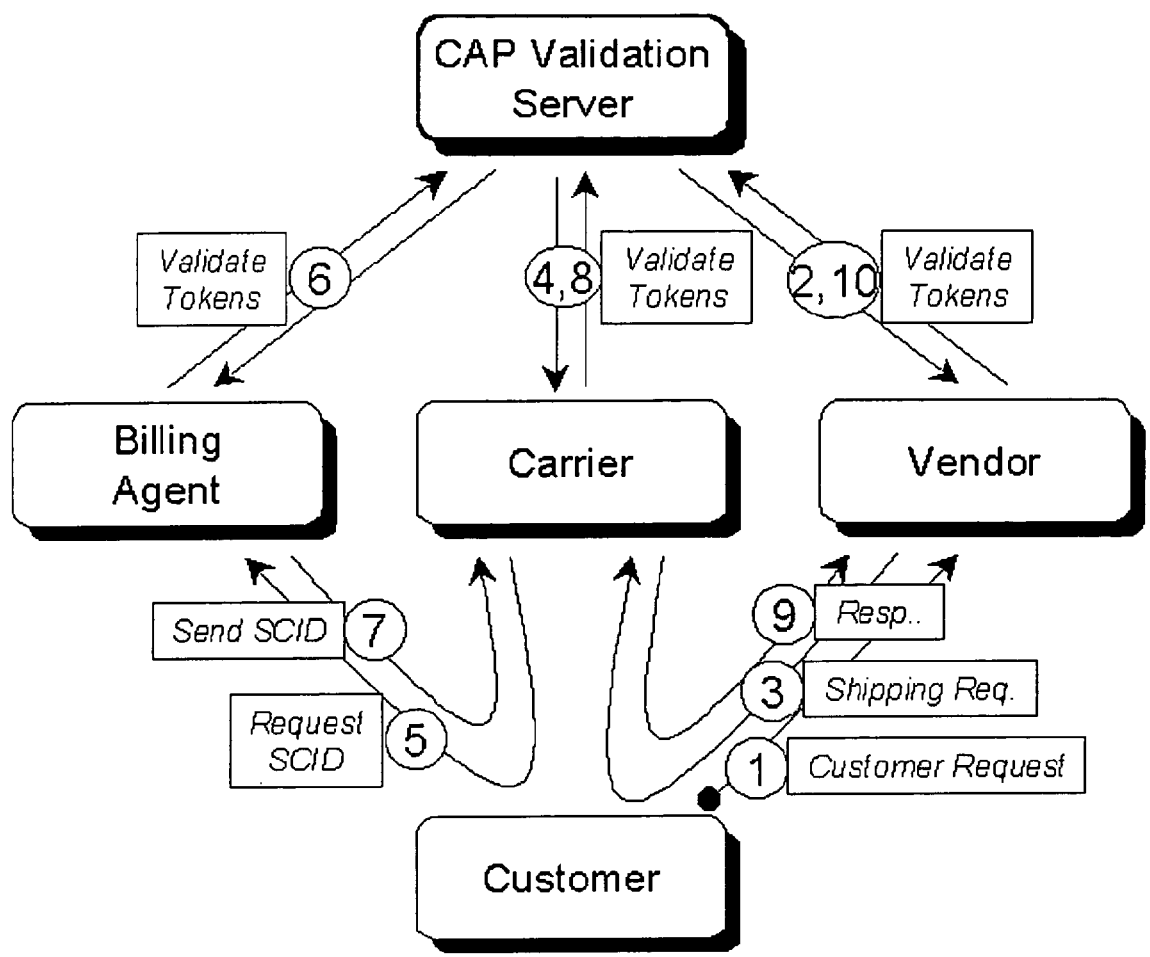
Figure 7: Anonymous Physical Purchase

COMPLETELY ANONYMOUS PURCHASING OF GOODS ON A COMPUTER NETWORK

CROSS-REFERENCE TO RELATED APPLICATIONS

The present application claims benefit of priority from U.S. Provisional Patent Application 60/242,971 filed Oct. 24, 2000 and International Application No. PCT/US01/45285 filed Oct. 24, 2001.

STATEMENT REGARDING FEDERALLY SPONSORED RESEARCH OR DEVELOPMENT

This invention has been created without the sponsorship or funding of any federally sponsored research or development program.

Contents
Overview 4
Completely Anonymous Purchasing . . . 4
Definition . . . 4
Problem . . . 4
Current Practices . . . 4
The Clickshare-CAP Solution . . . 6
Terminology 7
Customer/User . . . 7
Vendor . . . 7
Billing Agent . . . 7
Carrier . . . 8
Affiliate . . . 8
Clickshare-CAP Network . . . 8
Settlement Agent . . . 8
Clickshare-CAP Technology 8
Overview . . . 8
CAP Validation Service (CVS) . . . 9
User Authentication Module (UAM) [Billing Agent] . . . 10
Customer Validation Module (CVM) [Vendor] . . . 11
Destination Address Resolution Module (DARM) [Carrier] . . . 11
Site-specific Customer Identifier Module (SCIM) [part of UAM] . . . 12
Affiliation Certification Module [affiliates] . . . 12
CAP Settlement Service (CSS) [backend payment distribution] . . . 13
Information Flow Processes 13
Starting a Clickshare-CAP Session . . . 13
Sending Digital BoxCar(™)s . . . 15
Basic Anonymous purchase of digital content: . . . 15
Basic Anonymous purchase involving an Affiliate . . . 16
Basic Anonymous purchase involving a Carrier (CAP) . . . 17
Clickshare-CAP Inventions 18
Completely Anonymous Purchasing . . . 19
Shipping without an address . . . 21
Sales without customer account management . . . 22
Direct payments to Carriers . . . 23
Customer-Carrier Deals . . . 23
Anonymous package tracking . . . 24
Package tracking by Customer without tracking numbers . . . 24
Real-time information tracking . . . 26
Customized delivery instructions . . . 27
Certified Affiliations . . . 27
Summary 29
Completely Anonymous Purchasing . . . 29
CLAIMS . . . 24
ABSTRACT . . . 25
Figures . . . 33
Major Components . . . 33
Information Flow Processes . . . 2733

BACKGROUND OF THE INVENTION

Overview

Completely Anonymous Purchasing

Definition

Completely Anonymous Purchasing (CAP) is the ability to purchase physical goods via the Internet or other electronic means without the buyer revealing any personal information to the seller.

Problem

Systems currently exist that permit individuals to communicate anonymously with others via the Internet. These systems also permit buyers to purchase digital goods anonymously, since digital goods can be delivered via the same communication channels. When dealing with physical goods, however, the seller must be able to deliver the goods to the buyer through other channels, such as commercial shipping companies, which require personal information such as the name and address of the recipient. Existing systems such as drop boxes and intermediaries provide partial anonymity by allowing a buyer to have the goods shipped to an intermediary who then forwards the goods to the buyer. However, these systems greatly increase the cost of transport in terms of delivery time, expense, the ability to track packages, risk of loss, security, and convenience.

Thus, the central problem we solve is "providing Completely Anonymous Purchasing using the existing transport infrastructure with no additional costs."

Current Practices

Most physical goods are shipped by commercial carriers such as government run Postal Services, package delivery services such as United Parcel Service and Federal Express, and trucking companies such as Allied Transport, and many others. Regardless of carrier, the remote purchase of physical goods typically involves the following steps:

1. Buyer provides Seller with the buyer's name and address.
2. Seller enters this information and attaches it to the order information.
3. Seller selects carrier (possibly by asking user to select from a small collection of carriers).
4. Seller prepares printed shipping instructions in a form appropriate for the selected carrier.
5. Carrier takes possession of the goods and brings them to a local collection center.
6. Carrier attaches its own labels or codes to the package to help direct the package through the carrier's system.
7. Carrier delivers the package to the buyer's address.

The problem areas are steps 1, 2, and 4. Our solution solves these problems, taking advantage of step 6.

These and other difficulties experienced with the prior art systems have been obviated in a novel manner by the present invention.

It is, therefore, an outstanding object of the present invention to provide a system that allows completely anonymous purchasing on a global computer network like the Internet.

Another object of this invention is to provide a system that allows completely anonymous purchasing of services on a global computer network like the Internet.

A further object of the present invention is to provide a system that allows completely anonymous purchasing of goods on a global computer network like the Internet.

It is another object of the invention is to provide which allows completely anonymous purchasing on a global computer network like the Internet while providing customer information to the vendor sufficient to customize the sales transaction for the customer.

With the foregoing and other objects in view, which will appear as the description proceeds, the invention resides in the combination and arrangement of steps and the details of the process hereinafter described and claimed, it being understood that changes in the precise embodiment of the invention herein disclosed may be made within the scope of what is claimed without departing from the spirit of the invention.

BRIEF SUMMARY OF THE INVENTION

The Clickshare-CAP Solution

We solve the Completely Anonymous Purchasing problem by enabling the buyer to provide shipping instructions to the carrier directly. The Seller provides the carrier with the details of the packages to be shipped; the buyer provides the carrier with the shipping address; and the carrier provides the seller with a shipping identifier to place on the packages. When the carrier receives the package from the seller, it converts the shipping identifier to the complete address at the point at which it prints its own labels and delivers the package normally.

The complete solution utilizes a collection of inventions built upon a unique technology infrastructure that supports anonymous payment and secure, anonymous information exchange. The remainder of this document describes the solution and our inventions in detail. We begin by defining some common terms. We then describe the technology infrastructure and our inventions built using the technology. We end by summarizing how, together, the inventions solve the Completely Anonymous Purchasing problem.

BRIEF DESCRIPTION OF THE DRAWINGS

The character of the invention, however, may best be understood by reference to one of its structural forms, as illustrated by the accompanying drawings, in which:

FIG. 1 is a diagrammatic representation of the major components of a system embodying the principals of the present invention, FIG. 2 is a diagrammatic representation of a part of the system involving starting a session at a vendor, FIG. 3 is a diagrammatic representation of a part of the system involving starting a session at user's agent, FIG. 4 is a diagrammatic representation of a part of the system involving sending a Digital BoxCar, FIG. 5 is a diagrammatic representation of a part of the system involving anonymous digital purchase, FIG. 6 is a diagrammatic representation of a part of the system involving affinity certification, and FIG. 7 is a diagrammatic representation of a part of the system involving anonymous physical purchase.

DETAILED DESCRIPTION OF THE INVENTION

Terminology

FIG. 1 shows the entities involved in the purchase and delivery of physical goods in our solution. These entities have the following meanings:

Customer/User

The Customer or User is the person purchasing the physical goods and requesting delivery to an address of their choosing. This person is the Buyer described in the preceding section. From the Vendor's perspective, this person is their customer. From the perspective of this person's Billing Agent, this person is one of the Agent's Users.

Vendor

The Vendor is the organization providing goods to customers. This organization is the Seller described in the preceding section. Although we talk of buying and selling, our solution applies equally well to situations that involve transferring physical goods without payment.

Billing Agent

The Billing Agent is the organization chosen by the User to hold and protect the User's personal information and to handle billing the User for their purchases. A Billing Agent may bill Users directly, by making charges on the User's credit card, adding charges to a utility bill, directly debiting a bank account or other pre-funded account, or any other mechanism acceptable to the User. Settlement Agents transfer funds from Billing Agents to Vendors, Carriers, and other entities as specified in transaction logs generated during system operation.

Carrier

The Carrier is the organization chosen by the Vendor to deliver the physical goods from the goods' present location to the Customer's location. Typically, a Vendor will use a number of Carriers and may choose to let the Customer select one for a particular shipment.

Affiliate

An Affiliate is an organization or other grouping of prospective Customers with whom a Vendor may have a special arrangement. Examples include associations such as AARP and AAA, Customers of other Vendors, subscribers to a particular newspaper or journal, and professional organizations, such as AMA and IEEE.

Clickshare-CAP Network

The Clickshare-CAP Network is a collection of web servers and other technology that enables the secure and efficient transfer of the information necessary to support Completely Anonymous Purchasing and associated inventions.

Settlement Agent

A Settlement Agent acts as a clearinghouse that ensures that payments and transaction information are properly distributed among the various entities involved in the purchasing and delivery of physical goods. There may be multiple cooperating Settlement Agents run by different organizations.

Clickshare-CAP Technology

Overview

CAP is realized by a collection of inventions built using the Clickshare-CAP Infrastructure Technology. This technology enables the secure and efficient transfer of the information over the Internet, through wireless devices, and over other private networks.

The system is highly distributed with each player in a transaction responsible for managing the information that relates to that component. There is no central server. The core of the system is the CAP Validation Service (CVS). All of the other modules talk to this service via the Internet to verify the integrity of information passing among the various components.

The primary unit of information is the Token. A Token represents a capability that can be passed among the components. In its most common use, a Token indicates the presence of a valid Clickshare User Session. When a user authenticates with their Billing Agent, the agent asks the CAP Validation Service to create a new Clickshare User Session. The CVS creates the session and returns a new Token. This Token identifies the session, but contains no information identifying the User. Instead, the Token represents a capability to charge the User's account and, in some cases, to request information about the User. It travels among the components, with each component asking the CVS to verify that the Token is valid and to initiate an operation allowed by the Token. The Token can also be used to represent other capabilities such as the capability for one component to ask information about the User from another component.

A Digital BoxCar(™) allows one component to pass information securely to another component. When one component wants to send data to another, it asks CVS to create a hash of the Token and Digital BoxCar(™) combination. The receiving component can then ask CVS to verify that the Digital BoxCar(™) is intact when validating the received Token.

All components in the Clickshare-CAP Network can be replicated to provide Scalability and improved performance and up-time.

CAP Validation Service (CVS)

The CAP Validation Service provides runtime validation of information passed among the modules. This component ensures the integrity of the data passing over insecure networks and ensures that the various components are legitimately part of the Clickshare-CAP Network. The primary information it manages are the Tokens that indicate the presence of a valid Clickshare User Session and other capabilities.

This component can be implemented as a web server that provides a simple interface for other components to use. The basic operations include:
  Create or invalidate a Clickshare User Session
  Validate a Token
  Log a purchase
  Request or validate a capability
  Connect or disconnect a component from the Clickshare-CAP Network
  Transfer a User Session to and from another CVS Server User Authentication Module (UAM) [Billing Agent]

The User Authentication Module allows sites that register users to allow these users to use the Clickshare-CAP Network. Sites employing the UAM are called Billing Agents because they manage all aspects of the User's Clickshare Account, particularly aggregating the charges billed to the User's account and obtaining payment from the User for these charges. This module includes software that provides the following capabilities:
  allows the Billing Agent's user authentication software to communicate with CVS to create new Clickshare Sessions
  allows other components to request user information by presenting a CVS generated Token
  allows the Agent's user account management software to communicate with the Clickshare-CAP Settlement Service, in order to retrieve the transaction logs needed to update their user's accounts.

This module can be implemented as a collection of web server components (e.g., Java Servlets) and stand-alone programs.

Customer Validation Module (CVM) [Vendor]

The Customer Validation Module allows Vendors to connect to the Clickshare-CAP Network and provide Completely Anonymous Purchasing. This module includes software that provides the following capabilities:
  allows Vendor to communicate with CVS to validate its Customers' User Session Tokens
  allows Vendor to post charges onto the Customer's Clickshare Account, including posting charges to be paid to other entities such as Carriers and Affiliates
  allows Vendor to obtain a list of customer-defined address identifiers so that it can ask the customer which address it should use, without obtaining any details of the addresses
  allows Vendor to communicate with Carriers to obtain shipping id and pricing information
  allows Vendor to communicate with the Clickshare-CAP Settlement Service to retrieve confirming information on transactions logged by the Vendor This module can be implemented as a collection of web server components and stand-alone programs.

Destination Address Resolution Module (DARM) [Carrier]

The Destination Address Resolution Module allows Carriers to connect to the Clickshare-CAP Network to retrieve Customer address information and to respond to requests from Vendors and Customers. This module includes software that provides the following capabilities:
  allows Carrier to communicate with CVS to validate Customers' Tokens, receive from CVS a Token giving them the capability to retrieve the Customer's address information from their Billing Agent, and to communicate this request to the Billing Agent
  allows Carrier to communicate with CVS to facilitate securely sending a code back to the Vendor to be placed on the physical goods to be shipped
  allows Carrier to respond to Vendor requests for shipping This module can be implemented as a collection of web server components and stand-alone programs.

Site-specific Customer Identifier Module (SCIM) [part of UAM]

The Site-specific Customer Identifier Module allows a Billing Agent to generate and send an identifier that uniquely identifies the user on a particular site, but that differs for each site so that multiple sites cannot combine information about the User. Like all personal information, the User must explicitly authorize the release of a Site-specific Customer Identifier (SCID) to a particular site. Releasing a SCID to a site will allow that site to recognize when the same user contacts the site in the future. This lets the site maintain its own User-specific information. Releasing a SCID to a Vendor will allow the Vendor to build up a database of the Customer's activity on the Vendor's site, still without knowing who the Customer is. Releasing a SCID to a Shipper lets the shipper maintain special shipping instructions for the user.

Users do not need to know or remember SCIDs. They are managed entirely by their Billing Agent and the site to which the SCID was given.

Affiliation Certification Module [affiliates]

The Affiliation Certification Module allows a website to certify to others that a specific User is a member of a particular group, without releasing any identifying information about the User. Vendors can send a Customer's Session Token to an Affiliate site to ask if the User that the Token represents is a member of the Affiliate's group. The Affiliate site uses this module to communicate with CVS and the Customer's Billing Agent to retrieve the Customer's SCID and from this can determine if that Customer has previously been determined to be a member of the Affiliate's group. If the Customer has never registered with the Affiliate site, the Affiliate site can ask the Customer for information specific to the group that will identify the Customer as a member of the group. For example, the Automobile Association of America (AAA) might set up an Affiliate website that certifies whether a Customer is a member of AAA and, thus, eligible for discounts at various Vendor sites. When a Vendor site asks the AAA site to certify a Customer that has never been certified previously, the AAA site asks the Customer for a SCID, an AAA member number and additional information given when the Customer joined AAA. If the information matches the AAA member database, the AAA site remembers that the SCID corresponds to a valid AAA member and returns an affirmative response. Later, if another Vendor asks to certify the Customer, the AAA site retrieves the Customer's SCID, determines that the AAA membership is still valid and then sends an affirmative response.

In addition to certifying membership, an Affiliate site can be configured to either charge or pay the requesting site a fee for every affirmative certification that results in a sale, with the payment handling provided by the Clickshare-CAP Settlement Service.

CAP Settlement Service (CSS) [backend payment distribution]

The CAP Settlement Service (CSS) handles all of the logging and payment distribution among the players in CAP transactions. The CSS logs all CVS transactions and distributes these transaction logs to the various players: Vendors, Billing Agents, Carriers, and Affiliates, with each receiving only the logs pertaining to their function. In addition, the CSS aggregates the credits and debits for each site and handles, via the ACH or other financial network, the moving of money from site to site.

Information Flow Processes

In this section we describe the flow of information among the Clickshare-CAP components in a variety of situations.

Starting a Clickshare-CAP Session

Whenever a Customer attempts to access a Vendor's Clickshare-protected URL, the Vendor's CVM software looks for a User Session Token that it can send to the CVS for validation. There are two ways for Customers to obtain a User Session Token from their Billing Agent. If the Vendor's CVM software cannot find the Token, the Vendor asks the Customer to identify their Billing Agent and temporarily directs the Customer's browser to the Billing Agent's Login URL. Alternatively, Users can explicitly (or implicitly) begin a Clickshare-CAP Session by going to their Billing Agent's Login URL prior to requesting a Vendor's URL. We summarize the preferred implementation of these two processes below:

Scenario-A: Starting a Clickshare-CAP Session Directly from Vendor

Referring to FIG. 2, Starting a Session at a Vendor:
1. Customer contacts Vendor and eventually requests a Clickshare-Protected URL. [Step 1]
2. Vendor's CVM software looks for a User Session Token, and when not found, asks the Customer to provide their Billing Agent site name.
3. Vendor redirects Customer's browser to the Login URL on the indicated Billing Agent along with instructions on where to return that user after the session has been created. [Step 2]
4. Billing Agent asks for identifying information. This is usually a user name and password, but in some contexts may be intuited from the connection itself (e.g., ISP/Telco Billing Agents may be able to identify the User from the cell phone browser, or DSL connection).
5. If the Billing Agent accepts the User's information, it asks CVS to begin a new session. CVS responds with a new User Session Token. [Steps 3 & 4]
6. The Billing Agent directs the User's browser back to the Vendor's site, passing along the new Token. [Step 5]

Scenario-B: Starting a Clickshare-CAP Session on Billing Agent

Referring to FIG. 3, Starting a Session at User's Agent:
1. User contacts their Billing Agent's Login Page. [Step 1]
2. Billing Agent asks its User for identifying information.
3. If the Billing Agent accepts the User's information, it asks CVS to begin a new session. CVS responds with a new User Session Token. [Steps 2 & 3]
4. Billing Agent returns to the User's browser a customized page of links to content on the Billing Agent's site or other Vendors' sites. [Step 4]

Sending Digital BoxCar(™)s

The Clickshare-CAP Network allows clients to securely exchange information. The CVS acts as a negotiator, confirming the validity of each side of the transfer to the other and confirming the integrity of the Digital BoxCar(™) data. Clients use the following process in a preferred implementation to pass data securely:

Referring to FIG. 4: Sending Digital BoxCars:
1. Sender creates a Digital BoxCar(™).
2. Sender asks CVS to generate a Client Token whose hash includes the Digital BoxCar(™). [Steps 1 & 2]
3. Sender sends the Token and Digital BoxCar(™) to the Receiver. [Step 3]
4. Receiver asks CVS to validate the Token, which implies verifying that the Digital BoxCar(™) has not been tampered with. [Step 4]

A Receiver can respond using the same process.

Basic Anonymous purchase of digital content:

The simplest Clickshare-CAP transaction is the anonymous purchase of digital content. In these transactions, the Vendor immediately delivers the content to the Customer over the Internet.

In this and following scenarios, we assume that the Customer already started a Clickshare-CAP User Session using one of the preceding scenarios.

Referring to FIG. 5, Anonymous Digital Purchase:
1. A Customer requests a Vendor's Clickshare-protected URL. [Step 1]
2. The Vendor validates the token and determines access rights, and if a purchase is involved, the cost of the content to be delivered. [Steps 2 & 3]
3. The Vendor checks various Confirmation and Credit Limit thresholds, asking the Customer to confirm the purchase price, if necessary.
4. If access is allowed, the Vendor logs the transaction with CVS, along with purchase price, if any. [Steps 4 & 5]
5. Vendor delivers the content to the Customer's browser. [Step 6]

Basic Anonymous purchase involving an Affiliate

A Vendor may wish to confirm that a Customer is a member of one or more groups or associations in order to determine access rights or cost. The Customer's experience is similar to the previous example with the following additions:

Referring to FIG. 6, Affinity Certification:
1. Either before or after validating the Customer's Token, the Vendor tells the Customer the organizations with which it has special deals and asks the Customer to select the organizations of which they are members. [Step 1]
2. The Vendor asks CVS for a Token that represents the capability to ask for affiliation confirmation. [Steps 2]
3. For the organization with the best deal (or each selected organization, if desired) the Vendor redirects the Customer's browser to the organization's Affiliate Certification Server, sending the Customer's Token, the Vendor's Token, and instructions for returning the Customer's browser to the Vendor. [Step 3]

4. The Affiliation Certification Server validates the Vendor's Token and uses the Customer's Token to request information about the Customer, primarily their SCID (this process is described earlier). [Steps 4-8]

5. If the Affiliation Server has not previously seen the SCID or the Customer did not provide the necessary identifying information, the Server asks the Customer to release from their Billing Agent or otherwise provide information that identifies the Customer as a member of the organization. This information may include such items as the Customer's name and address (released from Billing Agent rather than typed in fresh), and a membership number. If the Customer previously provided sufficient information to the organization's Server, the Server will receive the latest version of the information previously released from the Billing Agent, and can use the SCID to look up any information the Customer provided directly to the Affiliation Certification Server, such as their membership number. The Server can then match this information against their membership database and determine the proper response to return to the Vendor.

6. The Affiliation Certification Server redirects the Customer's browser back to the Vendor according to the Vendor's instructions, along with a Digital BoxCar(™) containing the Server's response. [Step 9]

7. The Vendor uses the CVS to authenticate the Digital BoxCar(™) and adjusts its handling of the Customer according to the response from the Affiliation Certification Server. [Step 10]

Basic Anonymous purchase involving a Carrier (CAP)

The previous two processes cover purchases of Digital (intangible) goods. Here we describe the process, in the preferred implementation, for the anonymous purchase of Physical (tangible) goods. This process is very similar to that for confirming Affiliations.

Referring to FIG. 7, Anomymous Physical Purchase:

1. A Customer requests a Vendor's Clickshare-protected URL representing the desire to purchase some physical goods. [Step 1]

2. The Vendor validates the token, determines access rights, and if a purchase is involved, the cost of the content to be delivered. [Step 2]

3. The Vendor checks various Confirmation and Credit Limit thresholds, asking the Customer to confirm the purchase price, if necessary.

4. The Vendor asks the Customer to select a Carrier from the list of Carriers the Vendor uses.

5. The Vendor asks CVS for a Token that represents the capability to ask a Carrier for a shipping identifier.

6. The Vendor redirects the Customer's browser to the Carrier's server, sending the Customer's Token, the Vendor's Token, and a basic description of the packages, if available (number, weight, export restrictions). [Step 3]

7. The Carrier Server validates the Vendor's Token and uses the Customer's Token to request information about the Customer, primarily their SCID, shipping address, and any additional shipping instructions stored on the Customer's Billing Agent (this process is described earlier). [Steps 4-8]

8. If the Carrier Server has not previously seen the SCID, the Server asks the Customer to release from their Billing Agent or otherwise provide the necessary shipping instructions.

9. The Carrier Server assigns a shipping identifier and preliminary shipping costs, if possible.

10. The Carrier Server redirects the Customer's browser back to the Vendor according to the Vendor's instructions, along with a Digital BoxCar(™) containing the Server's response. [Step 9]

11. The Vendor uses the CVS to authenticate the Digital BoxCar(™) and, if appropriate, adjusts the Customer's retail cost according to the response from the Carrier's Server. [Step 10]

12. The Vendor validates the Customer's Token and logs the transaction with CVS, along with purchase price, if any, or with an identifier the Carrier will use later to fill in the shipping cost to be paid to the Carrier.

13. The Vendor packages the physical goods, labeling the packages with the shipping identifier received from the Carrier.

14. The Carrier picks up the packages and prints a complete label using the information it received from the Customer or their Billing Agent.

15. If directed by the Vendor's instructions, the Carrier logs an addendum to the Vendor's transaction with the wholesale cost of the shipping to be paid directly to the Carrier rather than the Vendor.

Clickshare-CAP Inventions

Our technology infrastructure provides the means to realize a number of unique inventions related to Completely Anonymous Purchasing. In this section we describe these inventions and how we use our technology infrastructure to realize each invention.

Completely Anonymous Purchasing

Invention: Applying Internet tools to pass user data directly from Customer's Billing Agent to the Carrier.

Description:

We provide CAP via a combination of technology that has the following characteristics:

1. A means to provide Customers the ability to select a trusted agent to handle their Clickshare Account and manage their personal information, including their name, address, and other shipping information.

2. A means to securely post charges onto a Customer's account without compromising the User's anonymity.

3. A means to obtain a shipping identifier from a Carrier that does not provide any personal information about the user.

4. A means for a Carrier to easily obtain a Customer's shipping information.

Realization:

Customers select a Billing Agent to handle their Clickshare-CAP Account and manage their personal information, including their name, address, and other shipping information.

When a Customer selects goods from a Vendor that require shipping, the Customer briefly goes to the Billing Agent's website and authenticates, which begins a Clickshare-CAP User Session. The CVS generates a Token and passes that to the Billing Agent, which in turn passes it to the Vendor, using any of a number of transport mechanisms (e.g., URL appends, Cookies, Direct communication).

The Vendor site selects a Carrier and sends to the Carrier, the Token and possibly other information, such as package size, weight, and number, hazardous materials notations, special delivery options.

The Carrier validates the Token and requests a new Token giving the Carrier permission to request the User's SCID and shipping information. The Carrier then sends this request to the Customer's Billing Agent, which is identified in the Customer's Token.

The Customer's Billing Agent determines if the user has previously given permission to release this information to this specific Carrier, and if so, sends the requested information. If not, either the Billing Agent or the Carrier asks the Customer for permission. If the Customer agrees, the information is sent. Otherwise, a failure is propagated back to the Vendor, which cancels the sale.

Once the shipping information has been sent to the Carrier, the Carrier generates a shipping identifier for the Vendor to place on the packages and pricing information to be viewed by the Vendor. The Carrier passes this information back to the Vendor using a Digital BoxCar(™) whose contents the CVS can later validate.

The Vendor completes the purchase by validating the Customer's Token and logs the purchase including both the charges to the Customer's account and a split of funds to be delivered to the Carrier and any Affiliates that may be involved.

Once the purchase has been completed, the Vendor packages the goods and marks them with the shipping identifier and transfers the package to the Carrier.

The Carrier brings the package to its local distribution center where the shipping identifier is replaced by a complete label with the Customer's address.

Finally the package is delivered using the existing transport infrastructure.

Additional Unique Attributes:
All Customer's personal information is managed from a single location. Carriers always get latest information.
Vendors can use many different shippers. Customer's can easily release shipping information to any Carrier, and can choose not to as well.
Carrier can easily "sign up" Vendors without any added effort. All Vendors have the same procedures.
Shipping procedures are simpler, require less information management, and are less error prone-no copying of addresses, no mistyped or out-of-date addresses or credit card numbers.
Requires nearly no changes to current Carrier business practices-just set up the Carrier web server and modify existing label preparation to generate labels from shipping identifiers.
Supports both wired and wireless web-based Internet interfaces for Customers and can be easily integrated with private network solutions such as e-book reader hardware, Palm devices, etc.

Shipping without an Address

Invention: Simplified "address-less" Vendor shipping process

Description:
Address-less shipping is beneficial even aside from the Anonymous Purchasing benefits. The Vendor can ship physical goods without the expense of managing physical addresses. The Vendor electronically receives a single shipping identifier, which is all that it needs to place on the shipping label. The Carrier does the rest. This avoids many problem areas for the Vendor:
mis-typed addresses in Customer forms
addresses lost or mangled when transferring to labels or other systems
out-of-date addresses stored from previous purchases
Customer push-back due to annoyance at having to provide shipping information
Customer push-back due to reluctance to provide personal information.

Realization:
Same as for the Completely Anonymous Purchasing invention, but without some of the additional constraints on anonymity. For example, the Vendor can still ask user for other personal information that may improve the Customer's buying experience.

Additional Unique Attributes:
Same as for the Completely Anonymous Purchasing invention.

Sales without Customer Account Management

Invention: A mechanism to enable Vendors to sell physical goods remotely without a complex e-commerce Customer Account Management System.

Description:
One of the major hurdles to creating an on-line store is managing the Customer Account Relationship. Our invention leverages existing account relationships to allow new e-tailers to sell goods without having to register Customers, obtain any payment information, or set up credit card processing systems. Instead, Billing Agents where 15 Customers are already registered handle User Management. The Vendor simply installs the Customer Validation Module, which validates Customers' Tokens and logs purchases via the CVS. Then, periodically, the CSS transfers funds into the Vendors bank account corresponding to the purchases the Vendor logged.

This invention is useful independently of Completely Anonymous Purchasing. However, together they greatly simplify the Vendor's job and reduce costs.

Realization:
Same as for the Completely Anonymous Purchasing invention, but optionally without the diversion to the Carrier to handle address-less shipping.

Additional Unique Attributes:
No longer limited to a few payment vehicles—Customers pay with any means supported by their chosen Billing Agent
Vendor can accept Customers from any Billing Agent-no 1-to-1 deals are necessary Direct Payments to Carriers Invention: A mechanism to simplify shipping procedures by paying the Carrier directly from funds collected from Customers by a third-party processor.

Description:
One of the extra tasks Vendors must handle is paying Carriers. This task can be taken over by the Clickshare-CAP Network, since all of the infrastructure and information already exists. The Vendor simply instructs the Clickshare-CAP Network, when it logs a purchase, to assign part of the purchase price for the transaction to the Carrier.

Realization:
Same as for the Address-less Shipping invention, but with the Carrier payment data added to the purchase transaction log.

Customer-Carrier Deals

Invention: A mechanism to allows Carriers to arrange special deals with individual Customers or Customers associated with some group, independent of the Vendor.

Description:
A Carrier can offer Customers special savings to encourage the Customers to choose that Carrier. These deals can be independent of Vendor so Carriers can market directly to Customers. Since the Carrier computes the price when assigning a shipping identifier, the Carrier is free to take into account Customer information (e.g., 10% discount if you click on this ad; or if you send us your email; or if you select us for 5 packages this month).

Realization:
Same as for the Address-less Shipping invention, but with the Carrier adjusting fee computation according to information it has about the Customer, or affiliation information it obtains from an Affiliation Server.

Additional Unique Attributes:
Builds Customer loyalty across all Vendors
Requires no additional infrastructure or process Anonymous Package Tracking
Invention: A mechanism that allows Vendors to receive delivery status information without revealing location or other Customer information.

Description:
Vendors must be able to determine when and if the packages they sent have been delivered. The shipping identifier amounts to a special tracking number that can be used to securely retrieve tracking information from the Carrier's web site and DARM software. The tracking number can be packaged in a Digital BoxCar(™) along with the Vendor's Token and sent to the Carriers DARM software. Upon receipt, the Carrier's software validates the token and Digital BoxCar (™). If these are valid, it looks up the package's status through custom software and returns the result, careful to omit any reference to specific locations, delivery address, or Customer identifying information.

Realization:
The Digital BoxCar(™) and Vendor Token capabilities are part of the technology infrastructure used to realize the Completely Anonymous Purchasing invention. The DARM software provides an additional interface to process Vendor queries.

Additional Unique Attributes:
Access to package status is secured from view by anyone other than the Vendor.

Package Tracking by Customer without Tracking Numbers
Invention: A mechanism to allow Customers to track packages being sent to them without needing to get any information from the sender, not even a tracking number or Carrier name.

Description:
Customers frequently want to know where their package is. With this invention, Customers can locate their packages without having to contact the Vendor for tracking number information. As soon as the purchase has been logged, the Clickshare-CAP system has sufficient information for the Customer to contact the Carrier directly and inquire about the shipment. This is done securely, so only the Customer can access this information via the web.

Realization:
In the course of Completely Anonymous Purchasing or Address-less Shipping, the Vendor completes a purchase by logging a transaction with the Clickshare-CAP Network. Although the Customer cannot access this information directly, the Customer can access their transaction log via their Billing Agent (and the UAM software). The transaction information includes the Carrier's Clickshare-CAP Identifier and the shipping number the Carrier returned to the Vendor. This information can be used to contact the Carrier with a User Session Token and a Digital BoxCar(™) containing the shipping information.
When a Carrier website receives a tracking request, it validates the User Session Token and requests the Customer's SCID. If the Token was valid, the SCID will match to the SCID used when the shipping identifier was created.
The shipping identifier is then used to look up the package tracking number or indicate that the package has not yet been picked up and assigned a tracking number. The tracking number can then be used to locate the package, with the results sent back to the Customer's browser.

Additional Unique Attributes:
Builds customer loyalty to Carrier due to ease of use.
Ensures that only the Customer that made the purchase can retrieve the tracking information.

Real-time Information Tracking
Invention: A mechanism that allows Customers to view their transaction logs in real-time.

Description:
The Clickshare-CAP Network maintains a log of all of the requests made to the CVS. Although Users cannot access this log directly, they can review a log of their own transactions via their Billing Agent. Depending on their Billing Agent's configuration, Users can either review past transactions, review recent transactions by explicitly requesting updates, or review transactions in real-time. In any form, providing this review improves security since the User can always determine exactly what information was released to whom and what purchases have been logged. The real-time mode can be supported if the Billing Agent is willing to retrieve transactions from the CSS frequently and update the User's display:

Realization:
Every significant action the CVS takes generates a log entry in the CSS database. Billing Agents poll this database periodically looking for transactions logged on behalf of the Billing Agent's Users.
The UAM software can respond to User requests to view the transaction log by either querying the CSS once, every time the user asks for an update, or more frequently. Each time new transactions arrive the UAM can format the results and display them to the User.

Additional Unique Attributes:
Only a Billing Agent and its users (and the CSS) can view the transaction logs for a particular User.
Provides a trusted log of information released to all parties.
Allows Users to quickly spot system failures or improperly operating Clickshare-CAP clients.

Customized Delivery Instructions
Invention: A mechanism to allow Customers to add special delivery instructions reliably.

Description:
When Customers remotely purchase goods for delivery they currently depend on the Vendor to pass on any special delivery instructions. Instructions such as "Leave package next door if no one is home" are easily missed when the Vendor arranges to ship the goods. Customers using the Clickshare-CAP Network, however, avoid this problem since they can communicate directly with the Carrier.

Realization:
When a Customer first releases their address information to a specific Carrier, the Customer can provide special instructions. Customers can also place special instructions in the shipping information stored at their Billing Agent, so whenever they release this information to any Carrier, the Carrier sees any special instructions. Storing the information on the Billing Agent has the added benefit that the Customer can update the special instructions once and all future shipments will use the updated instructions.

Additional Unique Attributes:
  Avoids shipping delays and mis-communication
  Allows the Carriers to better serve their Customers Certified Affiliations
  Invention: A mechanism to determine if a Customer is a member of a special group reliably and anonymously.

Description:
  Frequently, Vendors have special arrangement with Customers that belong to particular groups or organizations. For example, members of the American Automobile Association (AAA) may get discounts when purchasing travel books. Vendors can use the authentication capabilities of the Clickshare-CAP Network to validate Customers' affiliations.

Realization:
  When a Customer arrives on a Vendor's site the Vendor can ask if the Customer is a member of any groups with which the Vendor has a special arrangement. For example, a book vendor might ask if the Customer is a member of AAA, AARP, or IEEE.
  If the Customer selects AAA, the Vendor sends the Customer's Token to AAA's Affiliate Server.
  The AAA server validates the Token, asks for the User's SCID.
  If the server has previously determined that the Customer with that SCID is a member in good standing, the server sends an affirmative response back to the Vendor in a Digital BoxCar(™).
  If the server has never seen the SCID before, the server can ask the Customer for identifying information such as an address and member ID to determine membership.
  When the Vendor receives the response, it can validate the Digital BoxCar(™) and act accordingly.

Additional Unique Attributes:
  User only needs to enter membership information once.
  Affiliate Server can dynamically check that membership is in good standing and can offer Customer special deals, such as membership extensions and level increases.
  Vendor knows if the Customer is a member of the group, but not any other identifying information.
  Affiliate Server can accurately track Customer's use of special offers and discounts.
  Affiliate Server and Vendor can arrange for one or the other to be paid a commission for every certification that results in a purchase in a similar manner as described in the section on the Direct Payments to Carriers invention.
  A similar mechanism could be use to certify that the Customer's address is not within an export-controlled area: Vendor sends export restriction category to Carrier, which checks if the address is OK.

Summary: Completely Anonymous Purchasing
  The Clickshare-CAP Network provides a unique technology infrastructure that supports a collection of inventions supporting Completely Anonymous Purchasing. The principal ideas are:
  1. Customers select a Billing Agent, separate from the Vendor, to handle the Customer's account and to store and manage the Customer's personal information. This, along with the Network's authentication capabilities, allows Vendors to charge Customers for their purchases without the Customer providing any identifying information.
  2. Customers release their name, address, and other shipping information to Carriers directly, bypassing the Vendor site.
  3. The Carriers supply a shipping identification that allows Vendors to present the packages to the Carrier without having to know any identifying information about the Customer.

The Clickshare-CAP Network also supports other unique capabilities such as Affiliation Certification, special deals between Carriers and Customers, simplified package tracking for Customers, and others.

It is obvious that minor changes may be made in the form and construction of the invention without departing from the material spirit thereof. It is not, however, desired to confine the invention to the exact form herein shown and described, but it is desired to include all such as properly come within the scope claimed.

The invention claimed is:

1. A method for anonymous purchase of goods involving a Carrier who delivers the goods to the Customer, comprising the steps of:
  a) requesting, by a Customer, a Vendor's Universal Resource Locator representing the desire to purchase some physical goods,
  b) validating, by the Vendor, a Customer's token which determines access rights, and determining a cost of the goods to be delivered,
  c) checking, by the Vendor, at least one Credit Limit threshold, and asking the Customer to confirm the purchase price,
  d) receiving from the Customer, by the Vendor, a selection of a Carrier from a list including a plurality of Carriers,
  e) requesting, by the Vendor from a Central Validation Server, a Vendor's Token that represents the capability to ask a Carrier for a shipping identifier, the Vendor's Token comprising parcel information,
  f) redirecting the Customer's browser to the selected Carrier's server by the Vendor, sending the Customer's Token, and the Vendor's Token,
  g) validating, by a Carrier's server, the Vendor's Token and using the Custome's Token to request information about the Customer, comprising a shipping address,
  h) assigning a shipping identifier and shipping costs by the Carrier Server, based on at least the Customer's Token and the Vendor's Token,
  i) redirecting the Customer's browser back to the Vendor by the Carrier Server, along with a message containing at least the Carrier Server's response comprising the shipping identifier and shipping costs,
  j) using the Central Validation Server to authenticate the message and
  k) logging the transaction with the Central Validation Server, along an identifier to allow the Carrier to receive the shipping costs, and
  l) generating a shipping label by the Carrier to identify the Customer for delivery of the physical goods.

2. The method according to claim 1, wherein a Vendor receives anonymous physical delivery status information from the Carrier.

3. The method according to claim 1, further comprising the step of communicating between the Vendor and a remote Validation Server to verify the integrity of information communicated with the Customer and the Carrier.

4. The method according to claim 1, wherein the Customer communicates with a third party, wherein the Customer is identified to the third party and maintains an account therewith, to establish a user session to generate a Customer's token.

5. The method according to claim 1, wherein the Customer's token comprises an anonymous Customer identifier, and a set of permissible transaction parameters.

6. The method according to claim 1, wherein the Customer communicates with a third party, to establish a user session to generate a Customer's token and the third party creates a digital signature associated with communications of the Customer.

7. The method according to claim 1, wherein the Customer communicates with a third party, to establish a user session to generate a Customer's token and the third party maintains a set of restriction associated with each Customer.

8. The method according to claim 1, wherein a Customer's token identifies at least one of a plurality of third parties for authentication of the transaction.

9. The method according to claim 1, wherein the Customer communicates with a third party, to establish a user session to generate a Customer's token and the third party aggregates Customer-associated transactions into a single account.

10. The method according to claim 9, further comprising the step of the third party settling aggregated Customer-associated transactions with a Customer credit or debit account.

11. The method according to claim 1, wherein the Customer communicates with a third party, to establish a user session to generate a Customer's token, further comprising the step of the third party settling a Customer account with a Customer credit or debit account.

12. The method according to claim 1, wherein the Customer communicates with a third party, to establish a user session to generate a Customer's token, and the third party maintains an account with the Customer, further comprising the step of compensating a set of affiliates, by the third party, based a transaction between Customer and Vendor.

13. The method according to claim 1, wherein the Customer communicates with a third party, to establish a user session to generate a Customer's token and the third party maintains information defining predefined shipping instructions for the Customer.

14. The method according to claim 1, wherein a Customer has a plurality of predefined shipping instructions, and wherein the Customer communicates a selection of one of said predefined shipping instructions to the Vendor without communicating the predefined shipping instructions themselves.

15. The method according to claim 1, wherein the Vendor and Carrier communicate information to define a shipping cost, the shipping cost being passed to the Customer.

16. The method according to claim 1, wherein the Customer communicates with a third party, to establish a user session to generate a Customer's token and communications between Customer and Vendor, Customer and third party, Vendor and third party, and Vendor and Carrier all pass through the Internet.

17. The method according to claim 1, wherein the Customer communicates with the Vendor using a hypertext browser and defines communication sessions using uniform resource locators.

18. The method according to claim 1, further comprising the step of using the information about the customer to define a shipping label for a package containing the physical goods.

19. The method according to claim 1, wherein the Customer communicates with a third party, to establish a user session to generate a Customer's token, further comprising the step of providing, by the third party, a site specific customer identifier that uniquely identifies the Customer to the Vendor, but that differs for each other Vendor such that multiple Vendors sites cannot combine information about the Customer.

20. The method according to claim 1, further comprising the steps of communicating, from the Customer to the Vendor, information sufficient to determine an Affiliation, the Affiliation representing a group membership having an economic impact on the transaction.

21. The method according to claim 1, wherein communications between Customer and Vendor occur through a proxy.

22. The method according to claim 1, wherein a Customer directly provides customer-identifying information to a Carrier.

23. A method for anonymous purchase of goods involving a Carrier who delivers the goods to the Customer, comprising the steps of:
   a) receiving, from a Customer, a communication of a desire to purchase some physical goods through an Internet communication;
   b) validating, by the Vendor, a Customer's token which determines access rights, determining a cost of the goods to be delivered,
   c) checking, by the Vendor, at least one Credit Limit threshold,
   d) receiving by the Vendor, from the Customer, a selection of a Carrier from a list including a plurality of Carriers,
   e) requesting, by the Vendor, from a Central Validation Server, a Vendor's Token that represents the capability to ask a Carrier for a shipping identifier and comprising parcel information,
   f) redirecting the Customer's browser to the selected Carrier's server by the Vendor, sending the Customer's Token, and the Vendor's Token,
   g) validating the Vendor's Token by a Carrier's server and using the Customer's Token to request information about the Customer, comprising a shipping address, and assigning a shipping identifier and shipping costs by the Carrier Server based on at least the Customer's Token and the Vendor's Token, and communicating from the Customer's browser to the Vendor a message containing at least the Carrier Server's response comprising the shipping identifier and shipping costs,
   h) redirecting the Customer's browser back to the Vendor by the Carrier Server after said validating step,
   i) authenticating the message using the Central Validation Server,
   j) logging the transaction with the Central Validation Server, along with an identifier to allow the Carrier to receive the shipping costs, and
   k) generating a shipping label to identify the Customer for delivery of the physical goods.

24. The method according to claim 23, wherein the Customer communicates with a third party that maintains an account for the Customer, to establish a user session to generate a Customer's token.

* * * * *